(12) United States Patent
Armstrong et al.

(10) Patent No.: US 6,957,435 B2
(45) Date of Patent: Oct. 18, 2005

(54) METHOD AND APPARATUS FOR ALLOCATING PROCESSOR RESOURCES IN A LOGICALLY PARTITIONED COMPUTER SYSTEM

(75) Inventors: William Joseph Armstrong, Mantorville, MN (US); Mark Gregory Manges, Rochester, MN (US); Naresh Nayar, Rochester, MN (US); Jeffrey Jay Scheel, Rochester, MN (US); Craig Alden Wilcox, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 09/838,057

(22) Filed: Apr. 19, 2001

(65) Prior Publication Data

US 2002/0156824 A1 Oct. 24, 2002

(51) Int. Cl.⁷ .................................................. G06F 9/46
(52) U.S. Cl. ........................ 718/104; 712/13; 711/173
(58) Field of Search ................................ 718/100–105, 718/107; 712/12, 13; 711/173; 709/215

(56) References Cited

U.S. PATENT DOCUMENTS

| | | | |
|---|---|---|---|
| 4,843,541 A | 6/1989 | Bean et al. ................ 364/200 |
| 5,095,427 A | 3/1992 | Tanaka et al. |
| 5,222,215 A | 6/1993 | Chou et al. |
| 5,325,525 A | 6/1994 | Shan et al. |
| 5,325,526 A | * 6/1994 | Cameron et al. ........... 718/102 |
| 5,357,632 A | * 10/1994 | Pian et al. .................. 718/105 |
| 5,504,670 A | 4/1996 | Barth et al. |
| 5,535,321 A | 7/1996 | Massaro et al. |
| 5,574,914 A | * 11/1996 | Hancock et al. ........... 712/220 |
| 5,659,786 A | 8/1997 | George et al. .............. 395/653 |
| 5,692,193 A | 11/1997 | Jagannathan et al. |
| 5,872,963 A | 2/1999 | Bitar et al. |
| 6,199,093 B1 | * 3/2001 | Yokoya ...................... 718/102 |
| 6,247,109 B1 | * 6/2001 | Kleinsorge et al. ........... 712/13 |
| 6,269,391 B1 | 7/2001 | Gillespie |
| 6,418,460 B1 | 7/2002 | Bitar et al. |
| 6,542,926 B2 | * 4/2003 | Zalewski et al. ........... 709/213 |
| 6,587,938 B1 | 7/2003 | Eilert et al. |
| 6,598,069 B1 | * 7/2003 | Rooney et al. ............. 718/104 |
| 6,625,638 B1 | 9/2003 | Kubala et al. |
| 6,647,508 B2 | * 11/2003 | Zalewski et al. .............. 714/3 |
| 2001/0014905 A1 | 8/2001 | Onodera |
| 2003/0014466 A1 | 1/2003 | Berger et al. |

OTHER PUBLICATIONS

Bakshi "Partitioning and pipelining for performance–constrained hardware/software systems" 1999 IEEE, pp. 419–432.*

Ayachi et al. "a hierarchical processor scheduling policy for multiprocessor syatems" 1996 IEEE, pp. 100–109.*

(Continued)

*Primary Examiner*—Thomas Lee
*Assistant Examiner*—Van H. Nguyen
(74) *Attorney, Agent, or Firm*—Roy W. Truelson

(57) ABSTRACT

A processor allocation mechanism for a logically partitionable computer system allows an administrator to specify processing capability allocable to each partition as an equivalent number of processors, where the processing capability may be specified as a non-integer value. This processing capability value is unaffected by changes to the processing capability values of other partitions. The administrator may designate multiple sets of processors, assigning each physical processor of the system to a respective processor set. Each logical partition is constrained to execute in an assigned processor set, which may be shared by more than one partition. Preferably, the administrator may designate a logical partition as either capped, meaning that a partition can not use excess idle capacity of the processors, or uncapped, meaning that it can.

16 Claims, 8 Drawing Sheets

OTHER PUBLICATIONS

U.S. Appl. No. 09/672,043, entitled "Technique for Configuring Processors in System With Logical Partitions", filed Sep. 29, 2000.

IBM Corporation, S/390 Processor Resource/Systems Manager Planning Guide (IBM Pub. No. GA22–7236–04, 5$^{th}$ Edition, Mar. 1999).

David L. Black, "Scheduling Support for Concurrency and Parallelism in the Mach Operating System," Computer, IEEE Computer Society, vol. 23, No. 5, May 1, 1990, pp. 35–43.

T. L. Borden et al., "Multiple Operating Systems on One Processor Complex," IBM Systems Journal, vol. 28, No. 1, 1989, pp. 104–122.

Shigekazu Inohara et al., "A Thread Facility Based on User/Kernel Cooperation in the XERO Operating System," Computer Software and Applications Conference, 1991, Sep. 11, 1991, pp. 398–405.

Menasce, D. et al. "Capacity Planning and Performance Modeling", ISBN 0–13–035494–5, © 1994.

Leutenegger et al. " A Modeling Study of the TPC–C Benchmark", Proceedings of the 1993 ACM SIGMOD Int'l Conference on Management of Data, 1993, pp. 22–31.

Levine, C. "Order–of–Magnitude Advantage on TPC–C Through Massive Parallelism", Proceedings of the 1995 ACM SIGMOD Int'l Conference on Management of Data, 1995, pp. 464–465.

IBM Corporation, " AS/400 Logical Partitions Hardware Planning Guide", © 1999.

Schimunek, G. et al. "Slicing the AS/400 With Logical Partitioning: A How to Guide", Aug. 1999.

IBM Corporation, "LPAR Configuration and Management", First Edition, © Apr. 2002.

IBM AS/400e Logical Partitions: Learning About. © 1999, 2000. http://publib.boulder.ibm.com/pubs/html/as400/v4r5/ic2924/info/rzajx.pdf.

IBM AS/400e Logical Partitions: Planning for. © 1999, 2000. http://publib.boulder.ibm.com/pubs/html/as400/v4r5/ic2924info/rzait.pdf.

IBM AS/400e Logical Partitions: Creating. © 1999, 2000. http://publib.boulder.ibm.com/pubs/html/as400/v4r5/ic2924/info/rzaj7.pdf.

IBM AS/400e Logical Partitions: Managing. © 1999, 2000. http://publib.boulder.ibm.com/pubs/html/as400/v4r5/ic2924/info/rzaj6.pdf.

IBM AS/400e Logical Partitions: Troubleshooting. © 1999, 2000. http://publib.boulder.ibm.com/pubs/html/as400/v4r5/ic2924/info/rzaj8.pdf.

Marisa Gil et al., "The Enhancement of a User–level Thread Package Scheduling on Multiprocessors," Sep. 1994, Euromicro Workshop on Parallel and Distributed Processing, pp. 228–236.

* cited by examiner

METHOD AND APPARATUS FOR ALLOCATING PROCESSOR RESOURCES IN A LOGICALLY PARTITIONED COMPUTER SYSTEM

FIELD OF THE INVENTION

The present invention relates generally to digital data processing, and more particularly to the logical partitioning of components of a digital computer system.

BACKGROUND OF THE INVENTION

A modern computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of the circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is possible to improve system throughput by using multiple copies of certain components, and in particular, by using multiple processors. The modest cost of individual processors and other components packaged on integrated circuit chips has made this practical. As a result, many current large-scale system designs include multiple processors, caches, buses, I/O drivers, storage devices and so forth.

The proliferation of system components introduces various architectural issues involved in managing these resources. For example, multiple processors typically share the same main memory (although each processor may have it own cache). If two processors have the capability to concurrently read and update the same data, there must be mechanisms to assure that each processor has authority to access the data, and that the resulting data is not gibberish. Another architectural issue is the allocation of processing resources to different tasks in an efficient and "fair" manner, i.e., one which allows all tasks to obtain reasonable access to system resources. There are further architectural issues, which need not be enumerated in great detail here.

One recent development in response to this increased system complexity is to support logical partitioning of the various resources of a large computer system. Conceptually, logical partitioning means that multiple discrete partitions are established, and the system resources of certain types are assigned to respective partitions. Each task executes within a logical partition, meaning that it can use only the resources assigned to that partition, and not resources assigned to other partitions.

Logical partitions are generally allocated by a system administrator or user with similar authority. I.e., the allocation is performed by issuing commands to appropriate management software resident on the system, rather than by physical reconfiguration of hardware components. It is expected, and indeed one of the benefits of logical partitioning is, that the authorized user can re-allocate system resources in response to changing needs or improved understanding of system performance.

One of the resources commonly partitioned is the set of processors. In supporting the allocation of resources, and particularly processor resources, it is desirable to provide an easy to use interface which gives the authorized user predictable results. Current partitioning support may cause unwanted side-effects when shared processor allocations are changed. Changing processor allocation for one partition can affect the performance of other partitions which are unchanged. A need exists for resource allocation methods and apparatus which enable an administrator to more conveniently reallocate processor resources and achieve greater isolation of the effects of reallocation to specific targeted logical partitions.

SUMMARY OF THE INVENTION

A processor allocation mechanism for a logically partitionable computer system supports the allocation of processor resources to different partitions. An authorized user (administrator) specifies processing capability allocable to each partition as a scalar quantity representing a number of processors, where the processing capability may be specified as a non-integer value. This processing capability value is unaffected by changes to the processing capability values of other partitions. Preferably, the administrator may designate multiple sets of processors, and assign each physical processor of the system to a respective processor set. Each logical partition is constrained to execute in an assigned processor set.

In the preferred embodiment, certain processor sets are referred to as "pools", while others are dedicated to respective single partitions. A processor pool may be assigned to a single partition, or may be shared by more than one partition.

In the preferred embodiment, the administrator may designate a logical partition in a processor pool as either capped or uncapped. A capped partition is constrained to utilize no more than the specified processing capability allocable to the partition, even if processors are idle due to lack of available work from other partitions. An uncapped partition may utilize spare processing capability beyond its allocation, provided that it may not execute its tasks on physical processors outside its assigned processor pool.

In the preferred embodiment, the administrator may further specify a number of virtual processors for each partition in a processor pool. Such a specification will divide the processing capability available to the partition into the specified number of virtual processors.

The resource allocation mechanism described herein thus gives an administrator an effective interface for regulating processor resources among multiple tasks running in multiple logical partitions.

The details of the present invention, both as to its structure and operation, can best be understood in reference to the accompanying drawings, in which like reference numerals refer to like parts, and in which:

BRIEF DESCRIPTION OF THE DRAWINGS

FIG. 5A illustrating conceptually the overall time slice process; FIG. 5B illustrating the action taken when a partition processor resource counter reaches its limit; FIG. 5C illustrating the action taken to dispatch a new virtual processor when a physical processor becomes available; and FIG. 5D illustrates the action taken when a virtual processor becomes available for dispatch.

DETAILED DESCRIPTION OF THE PREFERRED EMBODIMENTS

Logical Partitioning Overview

Figure 1:
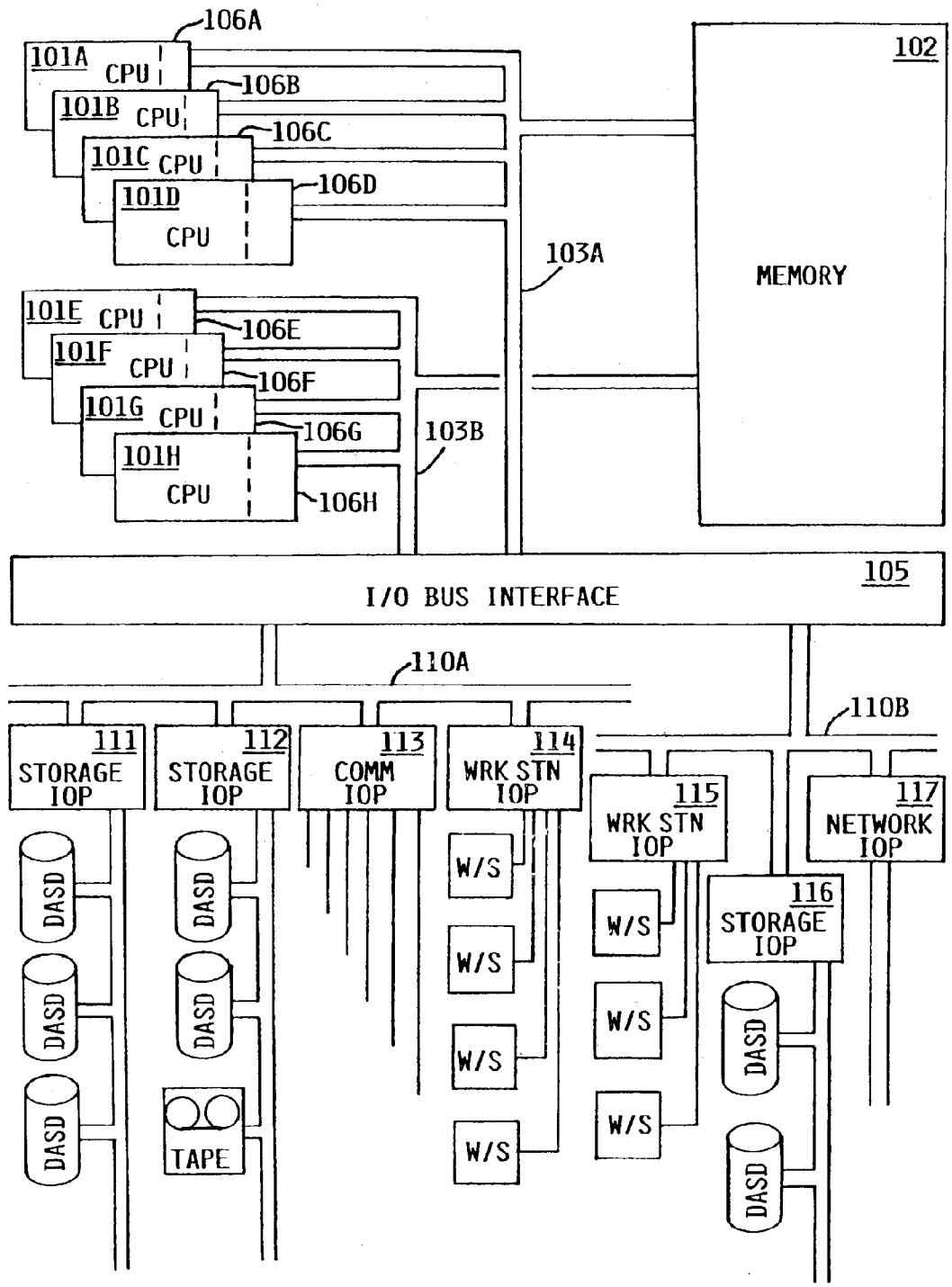
FIG. 1 is a high-level block diagram of the major hardware components of a logically partitioned computer system having multiple CPUs, according to the preferred embodiment of the invention described herein.

Logical partitioning is a technique for dividing a single large computer system into multiple partitions, each of which behaves in some respects as a separate computer system. Certain resources of the system may be allocated into discrete sets, such that there is no sharing of a single resource among different partitions, while other resources may be shared on a time interleaved or other basis. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources assigned to that partition, and not resources assigned to other partitions.

Logical partitioning is indeed logical rather than physical. A general purpose computer typically has physical data connections such as buses running between a resource in one partition and one in a different partition, and from a physical configuration standpoint, there is typically no distinction made with regard to logical partitions. Generally, logical partitioning is enforced by low-level encoded data, which is referred to as "licensed internal cod", although there may be a certain amount of hardware support for logical partitioning, such as hardware registers which hold state information. E.g., from a hardware standpoint, there is nothing which prevents a task executing in partition A from writing to an I/O device in partition B. Low level licensed internal code function and/or hardware prevent access to the resources in other partitions.

Code enforcement of logical partitioning constraints means that it is possible to alter the logical configuration of a logically partitioned computer system, i.e., to change the number of logical partitions or re-assign resources to different partitions, without reconfiguring hardware. Generally, a logical partition management tool is provided for this purpose. This management tool is intended for use by a single or a small group of authorized users, who are herein designated the system administrator. In the preferred embodiment described herein, this management tool is referred to as the "hypervisor". A portion of this management tool used for creating or altering a configuration executes in one of the logical partitions, herein designated the "primary partition".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. Finally, it makes it possible for a single computer system to concurrently support multiple operating systems, since each logical partition can be executing in a different operating system.

Additional background information regarding logical partitioning can be found in the following commonly owned patents and patent applications, which are herein incorporated by reference: Ser. No. 09/672,043, filed Sep. 29, 2000, entitled Technique for Configuring Processors in System With Logical Partitions; U.S. Pat. No. 6,436,671 to Doing et al., entitled Generating Partition Corresponding Real Address in Partitioned Mode Supporting System; U.S. Pat. No. 6,467,007 to Armstrong et al., entitled Processor Reset Generated Via Memory Access Interrupt; U.S. Pat. No. 6,681,240 to Armstrong et al., entitled Apparatus and Method for Specifying Maximum Interactive Performance in a Logical Partition of a Computer; Ser. No. 09/314,324, filed May 19, 1999, entitled Management of a Concurrent Use License in a Logically Partitioned Computer; U.S. Pat. No. 6,691,146 to Armstrong et al., entitled Logical Partition Manager and Method; U.S. Pat. No. 6,279,046 to Armstrong et al., entitled Event-Driven Communications Interface for Logically Partitioned Computer; U.S. Pat. No. 5,659,786 to George et al.; and U.S. Pat. No. 4,843,541 to Bean et al. The latter two patents describe implementations using the IBM S/360, S/370, S/390 and related architectures, while the remaining patents and applications describe implementations using the IBM AS/400 and related architectures.

Detailed Description

The major hardware components of a multiprocessor computer system 100 for utilizing a logical partitioning management tool according to the preferred embodiment of the present invention are shown in FIG. 1. Multiple central processing units (CPUs) 101A–101H concurrently perform basic machine processing function on instructions and data from main memory 102. Each processor contains or controls a respective cache. These cache structures are shown conceptually in FIG. 1 as a single block 106A–106G for each respective processor; however, it should be understood that the a processor's cache may include multiple separate structures at multiple levels, such as an on-chip L1 instruction cache, an on-chip L1 data cache, an on-chip L2 cache directory/controller, and an L2 cache memory on a separate chip. For purposes of this invention, the precise implementation details of caching in each processor are not significant, and the caches could be implemented differently.

A pair of memory buses 103A, 103B connect the various CPUs, main memory, and I/O bus interface unit 105. I/O bus interface unit 105 communicates with multiple I/O processing units (IOPs) 111–117 through respective system I/O buses 110A, 110B. In the preferred embodiment, each system I/O bus is an industry standard PCI bus. The IOPs support communication with a variety of storage and I/O devices, such as direct access storage devices (DASD), tape drives, workstations, printers, and remote communications lines for communication with remote devices or other computer systems. While eight CPUs, two memory buses, two I/O buses, and various numbers of IOPs and other devices are shown in FIG. 1, it should be understood that FIG. 1 is intended only as an illustration of the possible types of devices that may be supported, and the actual number and configuration of CPUs, buses, and various other units may vary. It should also be understood that the buses are illustrated in a simplified form as providing communications paths between various devices, and in fact the actual bus structure may be more complex, and contain additional hierarchies or components not shown. For simplicity, CPUs, memory buses and I/O buses are herein designated generically by reference numbers 101, 103 and 110, respectively.

While various system components have been described and shown at a high level, it should be understood that a typical computer system contains many other components not shown, which are not essential to an understanding of the present invention. In the preferred embodiment, computer system 100 is a multiprocessor computer system based on the IBM AS/400 or I/Series architecture, it being understood that the present invention could be implemented on other multiprocessor computer systems.

Figure 2:
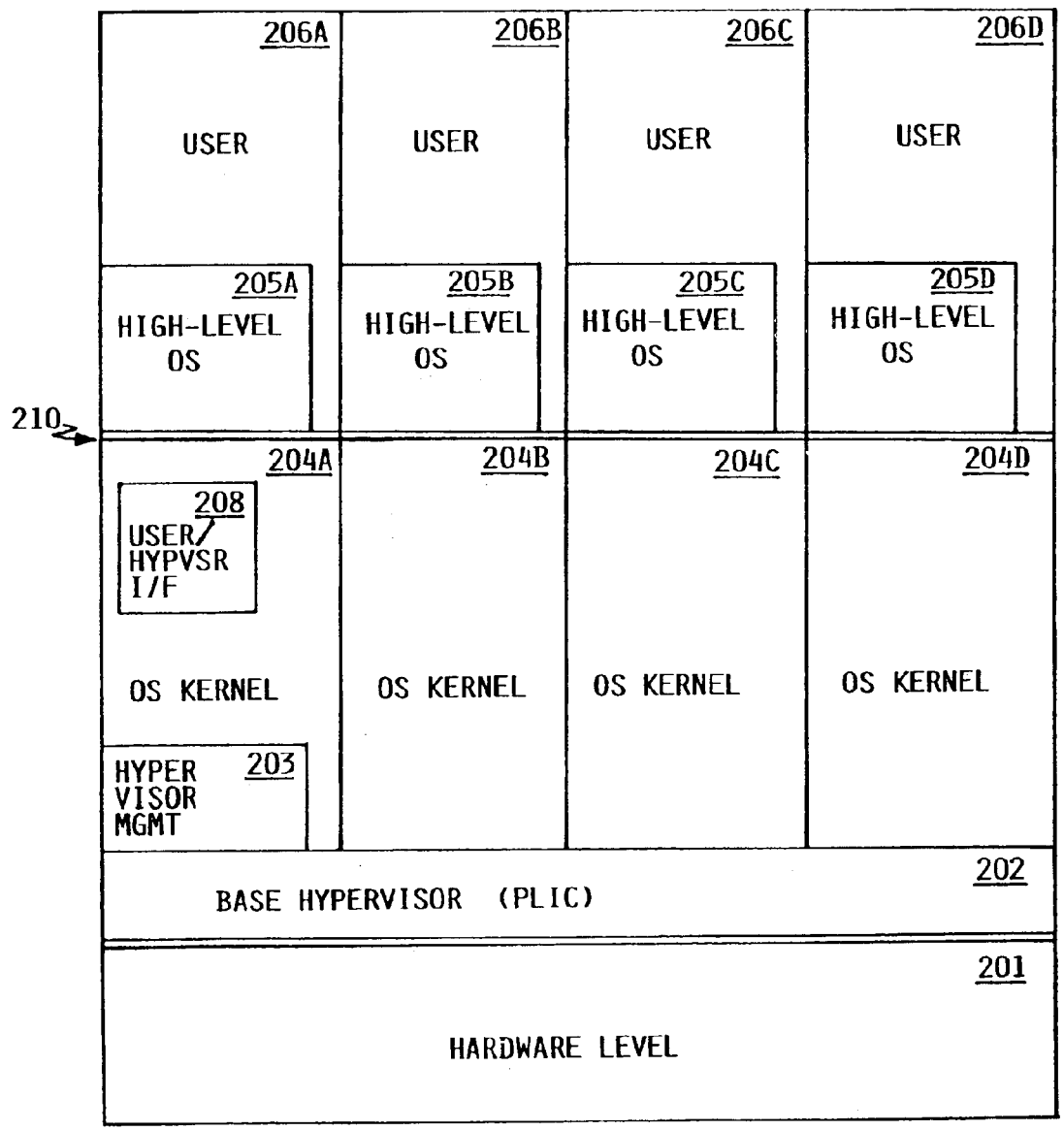
FIG. 2 is a conceptual illustration showing the existence of logical partitions at different hardware and software levels of abstraction in a computer system, according to the preferred embodiment.

FIG. 2 is a conceptual illustration showing the existence of logical partitions at different hardware and software levels of abstraction in computer system 100. FIG. 2 represents a system having four logical partitions, it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 2, the "higher" levels of abstraction are represented toward the top of the figure, while lower levels are represented toward the bottom.

As shown in FIG. 2 and explained earlier, logical partitioning is a code-enforced concept. At the hardware level 201, logical partitioning does not exist. As used herein, hardware level 201 represents the collection of physical devices (as opposed to data stored in devices), such as processors, memory, buses, I/O devices, etc., shown in FIG. 1, including other hardware not shown in FIG. 1. As far as a processor 101 is concerned, it is merely executing machine language instructions. In the preferred embodiment, each processor is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 2 as a single entity 201, which does not distinguish between logical partitions.

Immediately above the hardware is a common low-level hypervisor base 202, also called partitioning licensed internal code (PLIC), which enforces logical partitioning. As represented in FIG. 2, there is no direct path between higher levels (levels above hypervisor 202) and hardware level 201, meaning that commands or instructions generated at higher levels must pass through hypervisor 202 before execution on the hardware. Hypervisor 202 enforces logical partitioning of processor resources by presenting a partitioned view of hardware to the task dispatchers at higher levels. I.e., task dispatchers at a higher level (the OS kernel) dispatch tasks to virtual processors defined by the logical partitioning parameters, and the hypervisor in turn dispatches virtual processors to physical processors at the hardware level 201 for execution of the underlying task, as described more fully herein. The hypervisor also enforces partitioning of other resources, such as allocations of memory to partitions, and routing I/O to I/O devices associated with the proper partition. Hypervisor 202 contains state data, some of which may be stored in special purpose registers while other such state data is stored in tables or other structures. Essentially, this state data defines the allocation of resources in logical partitions, and the allocation is altered by changing the state data rather than by physical reconfiguration of hardware.

Above hypervisor 202 is another level of machine management code herein identified as the "OS kernel" 204A–204D. At the level of the OS kernel, each partition behaves differently, and therefore FIG. 2 represents the OS Kernel as four different entities 204A–204D corresponding to the four different partitions. In general, each OS kernel 204A–204D performs roughly equivalent functions, and the OS kernel is herein generically referred to as feature 204. However, it is not necessarily true that all OS kernel 204A–204D are identical copies of licensed internal code, and they could be different versions of architecturally equivalent licensed internal code, or could even be architecturally different licensed internal code modules. OS kernel 204 performs a variety of task management functions, and in particular, enforces data integrity and security among multiple tasks.

Above the OS kernel are a set of high-level operating system functions 205A–205D, and user application code and data 206A–206D. A user may create code in levels 206A–206D which invokes one of high level operating system functions 205A–205D to access the OS kernel, or may directly access the OS kernel. This is represented in FIG. 2 by showing that both high level operating system functions 205A–205D and user application levels 206A–206D reach the OS kernel boundary. In the AS/400 architecture, a user-accessible architecturally fixed "machine interface" 210 forms the upper boundary of the OS kernel, (the OS kernel being referred to as "SLIC"), but it should be understood that different operating system architectures may define this interface differently, and that it would be possible to operate different operating systems on a common hardware platform using logical partitioning.

One and only one of the logical partitions is designated the primary partition, which is the partition used by the system administrator to manage logical partitioning. The primary partition contains a special portion of hypervisor code 203 which shares the level of OS kernel 204A. Hypervisor portion 203 contains code necessary to create or alter logical partition definitions. Collectively, hypervisor portion 203 and hypervisor base 202 constitute the hypervisor. Additionally, a user-to-hypervisor interface 208 is provided at the OS kernel level in the primary partition. Interface 208 provides functions for interacting with a user (system administrator) to obtain user-specified partitioning parameters. The functions available in interface 208 may be used directly in a direct-attach terminal, or may be accessed through a set of APIs from other interface code (not shown) in any device (such as an intelligent workstation) connected to computer system 100. The hypervisor is super-privileged code which is capable of accessing resources, and specifically processor resources, in any partition. The hypervisor causes state values to be written to various hardware registers and other structures, which define the boundaries and behavior of the logical partitions.

In accordance with the preferred embodiment, the administrator defines multiple logical partitions and the resources available to each. With respect to processing resource, the administrator specifies four things: the number of virtual processors available to each partition, the processing capacity available to the partition, whether the assigned processing capacity is capped, and the assignment of physical processors to partitions. Any or all of these parameters may be changed by the administrator, effecting an altered configuration. These parameters are explained with reference to the examples below.

Figure 3:
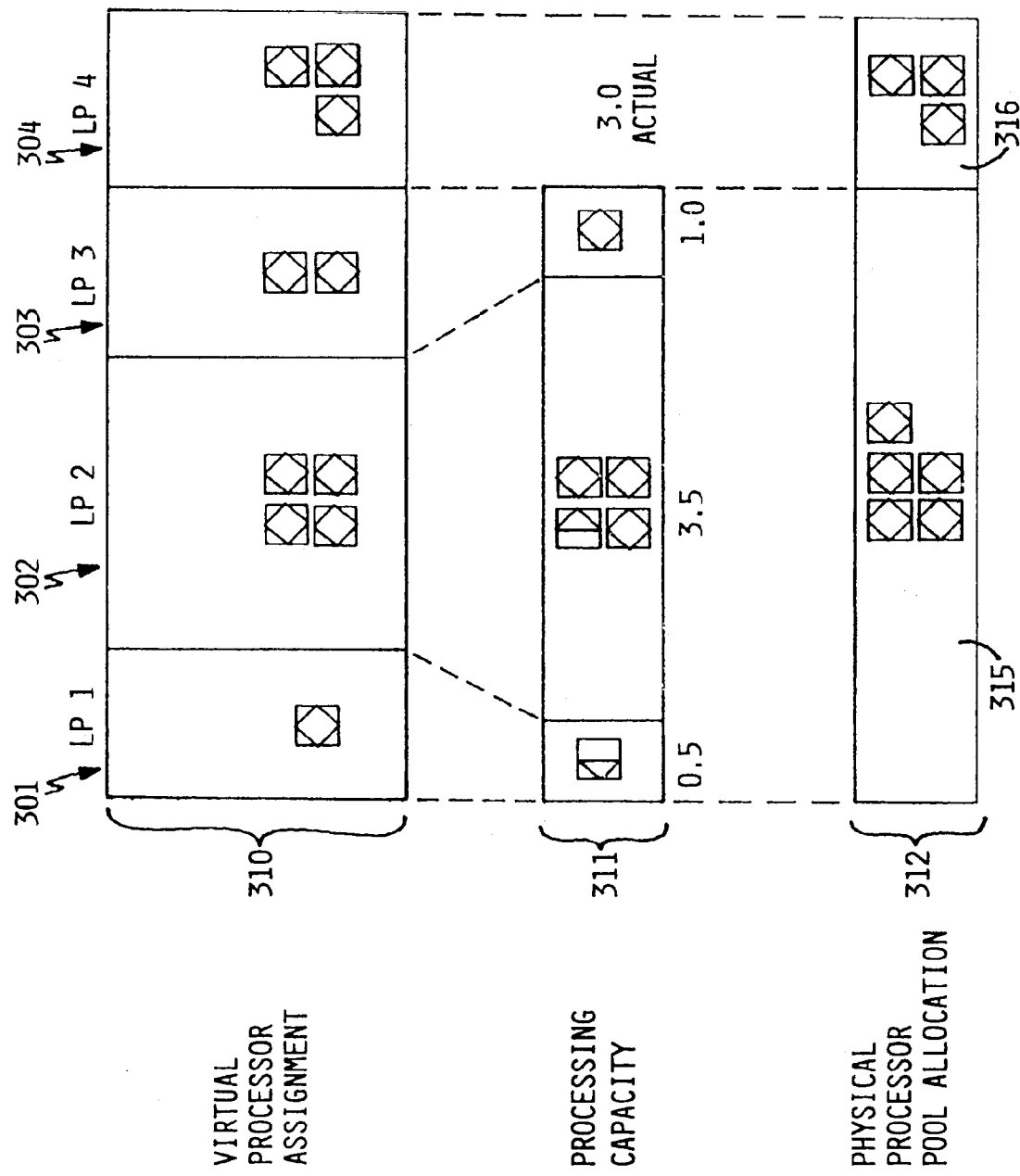
FIG. 3 shows an example logical partitioning processor allocation for a system having eight physical processors, according to the preferred embodiment.

FIG. 3 shows an example logical partitioning processor allocation for a system having eight physical processors. As shown in FIG. 3, four logical partitions 301–304 are defined. For each logical partition, there exists a respective virtual processor assignment 310, and a processing capacity allocation 311. Additionally, there exists an allocation 312 for physical processors. In the example of FIG. 3, logical partition 301 is assigned one virtual processor and 0.5 processing unit of processing capacity; logical partition 302 is assigned four virtual processors and 3.5 processing units of processing capacity; and partition 303 is assigned two virtual processors and 1.0 unit of processing capacity. Partition 304 is assigned three dedicated processors (an actual processing capacity of 3.0 units). Virtual processors are always assigned in integer numbers. Processing capacity is expressed as a decimal.

In the example of FIG. 3, two sets of processors 315, 316 are defined. Set 315, which is a "pool", contains five physical processors, while set 316 contains three. Logical partitions 301–303 execute in pool 315, while partition 304 executes in set 316.

A physical processor allocation constrains a task executing in an associated partition to run on only the processors allocated to the processor set to which the partition is assigned. In this embodiment, a set of one or more processors may be assigned to a partition in dedicated mode, or may be assigned to a processor pool, to which one or more partitions are in turn assigned. Dedicated mode means simply that the full capacity of the set of physical processors is dedicated to a single partition. In a pooled mode, the processors are assigned to a pool, which is typically (although not necessarily) shared among more than one partition. Dedicated mode is functionally equivalent to a pool to which only one logical partition is assigned, and in which the full capacity and number of virtual processors of the pool are given to the one partition.

Thus, in the example of FIG. 3, set 315 is shared among multiple partitions and is a processor pool, while set 316 is a set of processors dedicated to partition 304. A task executing in partition 301 can be dispatched to any of the five physical processors allocated to pool 315, but can not be dispatched to any of the three physical processors allocated to set 316, even if those processors are idle. Since pool 315 is shared among partitions 301–303, the tasks executing in these partitions share the five processors assigned to pool 315.

The processing capacity allocation specifies the amount of equivalent processing power allocated to a partition in processor units. I.e., one processor unit is the equivalent of a single physical processor executing 100% of the time. The sum of the processing capacity allocations of all partitions assigned to a particular processor pool can not exceed the number of physical processors in the pool, although it may be less than the number of physical processors in the pool (in which case, there is unallocated processor capacity). Thus, if the administrator changes the processing capacity allocation of a single partition assigned to a pool, this change has no effect on the processing capacity allocations to the remaining partitions assigned to the same pool. The unallocated processor capacity is merely increased or decreased accordingly.

In the example of FIG. 3, logical partition 301 is allocated 0.5 units of processing capacity, which means it is allocated a capacity equivalent to one physical processor executing 50% of the time (or running at 50% of normal speed). However, this does not mean that one of the processors in pool 315 will execute roughly half time on behalf of tasks in partition 301. Work from any one partition assigned to a pool is distributed among the processors in the pool, and it can be expected that on the average each of the five processors in pool 315 will devote about 10% of its capacity to executing on behalf of tasks from partition 301. In the preferred embodiment, processing units are assigned in increments of 0.01 units, with a minimum value of 0.10 units assignable to any single partition. The user specifies a processing capacity allocation only for partitions assigned to pools; partitions having dedicated processors automatically receive the full capacity of the dedicated processors. FIG. 3 therefore shows a processing capacity of 3.0 for partition 304, this being an equivalent number, although in fact the user does not specify a processing capacity.

The virtual processor assignment specifies the number of virtual processors seen by each respective partition which is assigned to a pool of processors. To the partition, the underlying hardware and dispatching code behaves like the number of virtual processors specified, each of which is running at some fraction of the power of a single physical processor, the fraction being the number of virtual processors divided by the number processing units allocated to the partition. Thus, in the example of FIG. 3, partition 302 sees four virtual processors, each operating at approximately 82.5% (3.5/4) of the capacity of a single physical processor. Partition 303 sees two virtual processors, each operating at 50% of the capacity of a single physical processor. Like processing capacity, the user specifies a virtual processor allocation only for partitions assigned to pools; partitions having dedicated processors automatically receive a number of virtual processors equal to physical processors. FIG. 3 therefore shows three virtual processors for partition 304.

A logical partition assigned to a pool may be designated either capped or uncapped. A capped partition can not use more processing capacity than its allocation, even if processors are idle due to lack of available work from other partitions in the same pool. Capping assures that a particular logical partition will not exceed its allocated usage, which is desirable in some circumstances. An uncapped partition may utilize spare processing capability beyond its allocation, provided that it may not execute its tasks on physical processors outside its assigned processor pool. Capping does not apply to partitions having dedicated processors.

Referring to the example of FIG. 3, if partition 301 is uncapped and it has reached its allocated processing capacity during a particular time interval, the tasks in partition 301 will wait in a deferred status for an available physical processor (i.e, tasks may be dispatched to virtual processors by the OS kernel, but the hypervisor will not dispatch the virtual processors to physical processors, and no execution will take place). As long as each of the other processors in pool 315 has work to perform on behalf of logical partition 302 or 303 (and these partitions have not yet reached their allocated processing capacity), the tasks in partition 301 will wait. If any processor in pool 315 has no other work to perform, it will begin executing a task from partition 301, allowing the actual processor usage for partition 301 to exceed its allocation. In no case will a task in partition 301 execute on a processor in set 316, even if these processors are idle.

Selective use of capping allows the administrator to configure different pools for different environments. For example, a partition having large fluctuations in expected workload might be configured to run in the same pool as a lower priority but more constant work stream partition, allowing the latter to use the excess capacity of the former. On the other hand, partitions which should be limited to a particular processor capacity (e.g., because the end user is paying for a certain capacity) may run together in a capped environment.

The configuration of FIG. 3 is merely a single example configuration, and many variations are possible. The number of processor sets may vary. Since sets of processors are disjoint and each set must have at least one physical processor, the number of such sets is necessarily limited by the number of physical processors in the system. But in other respects, the administrator is free to allocate sets as he wishes, and may allocate zero, one or multiple sets which are pools, and zero, one or multiple sets which are dedicated to a single respective logical partition. Additionally, while a processor pool is usually used for sharing among multiple partitions, a processor pool could have only a single partition assigned to it. For example, if for some reason it is desired to limit the processor resources allocated to a single logical partition, a pool containing a single processor could be defined, to which a single logical partition is assigned, the partition being given a processing capacity of 0.5 processors and specified as capped.

Figure 4:
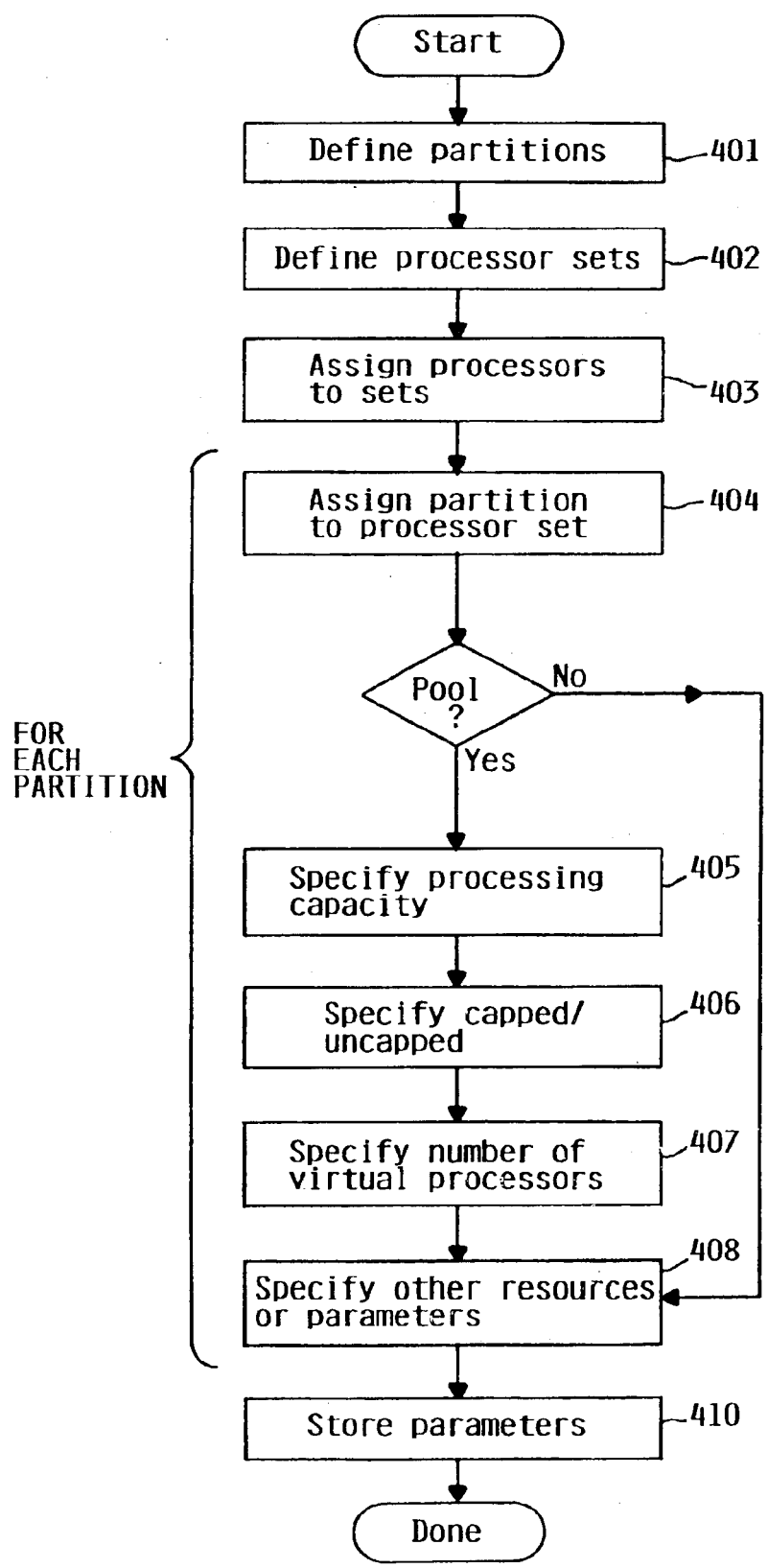
FIG. 4 is a high-level block diagram of the process of obtaining input to define the characteristics of the logical partitions, according to the preferred embodiment.

In the preferred embodiment, the hypervisor enters state values in registers and memory, which define the partitions and cause partitioning constraints to be enforced. The hypervisor obtains this information from the administrator. FIG. 4 is a high-level block diagram of the process of soliciting and saving user (administrator) input defining the characteristics of the logical partitions.

As shown in FIG. 4, the administrator first defines the number of partitions themselves (step 401), one of which is designated the primary partition. The administrator also defines the number of sets of processors, including any which are pools (step 402), and assigns each individual physical processor to one of the defined sets (step 403). A processor may be assigned, e.g., by address or physical location, but it is significant that specific physical processors are assigned. A set of processors, whether a pool or a dedicated set, is a collection of specific physical processors, not a virtual capacity construct.

For each defined partition, the following steps 404–407 are performed. The administrator assigns the partition to one and only one of the previously defined processor sets (step 404), meaning that tasks within the partition will execute only in the physical processors assigned to that processor set. If the assigned set is a pool, then steps 405–407 are performed; if the assigned set is a set of dedicated processors, these steps are unnecessary.

The administrator specifies the processing capacity value allocable to the partition as a decimal number (step 405). The total processing capacity value of all partitions assigned to a particular processor pool can not exceed the number of physical processors in the pool. Input from the administrator can be solicited in any of various ways, but it is appropriate to display, either graphically or numerically, the remaining unused processor capacity of the pool to which the partition has been assigned. The system will not accept a processor value which is too high.

The administrator designates the partition as either capped or uncapped (step 406), this designation having the meaning previously explained. Finally, the administrator specifies the number of virtual processors for the partition (step 407), this specification also being explained above. The number of virtual processors must be an integer, and must be equal to or greater than the processor capacity value.

The administrator may specify additional parameters of each logical partition (step 408). For example, the administrator may specify the amount of memory allocation for each partition, I/O devices to be used, and so forth.

When the partitions have been defined and characterized as explained above, the hypervisor stores this information in various registers, tables and other constructs, which effectively configures the system as a logically partitioned system. Hypervisor 202 and hardware 201 thereafter enforce logical partitioning in accordance with these state values, as explained in greater detail below.

The user interface presented to an administrator to obtain partitioning data as described above may take any appropriate form, e.g., the interface may be textual or a graphical user interface (GUI). It will be appreciated that certain steps depicted in FIG. 4 may be performed in a different order. Essentially the same process may be used for reconfiguring or changing an existing logical configuration, although in the case of a change, the administrator may omit steps for inputting parameters which are not to be altered.

With state data entered in appropriate registers and tables to configure logical partitioning, hypervisor 202 and hardware 201 enforce logical partitioning, and in particular, enforces constraints on the use of processor resources. FIGS. 5A–5D illustrate from a process viewpoint the operation of the various virtual processor dispatching enforcement mechanisms for processor pools. It should be understood that the processes shown in FIGS. 5A–5D do not apply to partitions using dedicated processors; in the case of dedicated processors, the hypervisor directly maps virtual processors seen by the OS kernel to physical processors, and therefore directly passes through task dispatches generated by the OS kernel to the appropriate physical processor. Although FIGS. 5A–5D illustrate various steps in a sequential manner, it should be understood that these mechanisms are not necessarily sequentially executing code, and may be combinatorial logic hardware or combinations of code and hardware which make decisions based on various state inputs.

In operation, pooled processor constraints are enforced by taking time slices of system operation, and setting timers for each of various processes in a time slice. When the timers time out, some action is taken, such as limiting further execution of a task. The various actions may be triggered, e.g., by interrupts or similar hardware signals generated by a time-out, a task termination, a task becoming idle, etc.

Figure 5A:
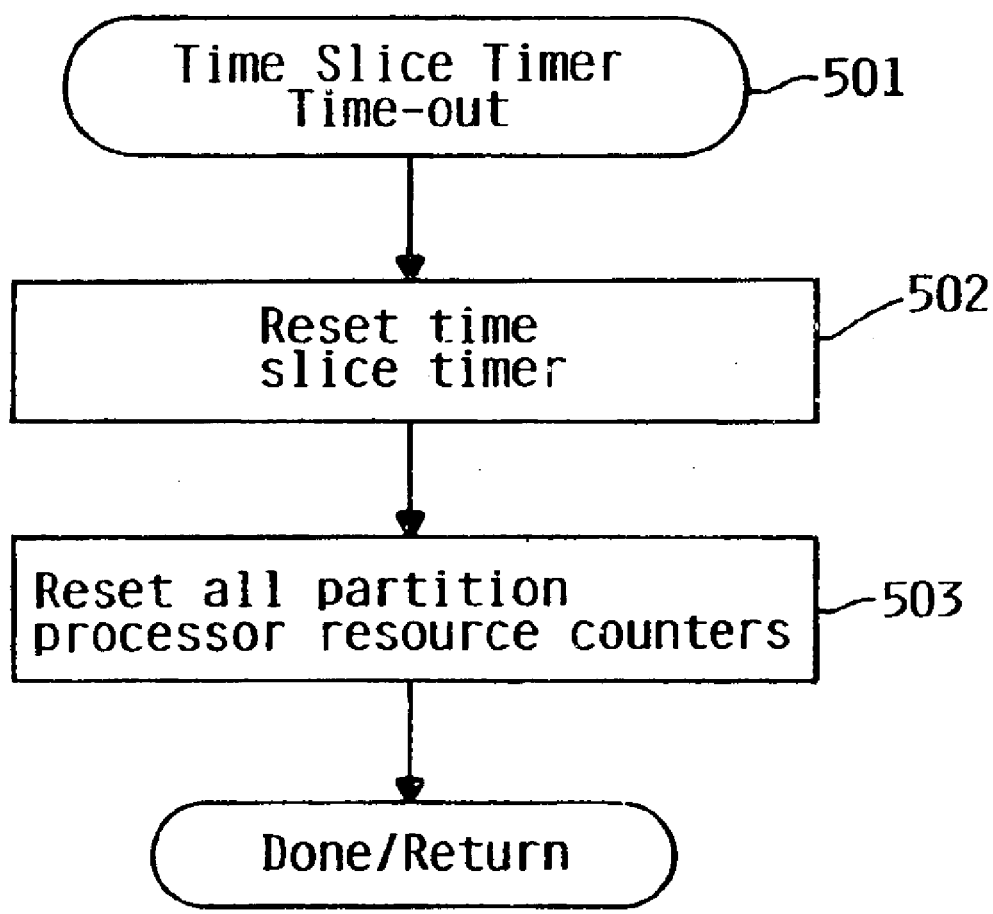
FIGS. 5A–5D illustrate the operation of the various virtual processor dispatching enforcement mechanisms, according to the preferred embodiment.

FIG. 5A illustrates conceptually the overall time slice process. A time slice timer is used to divide time into discrete slices. When the timer times out, a time out signal is generated 501. The time slice timer is then reset to the nominal value of a time slice (step 502). Additionally, a respective partition processor resource counter is reset for each partition (step 503); the partition processor resource counter tracks total processor time available to executing virtual processors from the respective partition during the current time slice. The counter may, e.g., be reset to an initial value corresponding to the processor capacity allocated to a partition, and decremented as each task is executed in a processor. When the counter reaches a limiting value (such as zero), the partition has used up its allocation of processor resource for the current time slice.

Figure 5B:
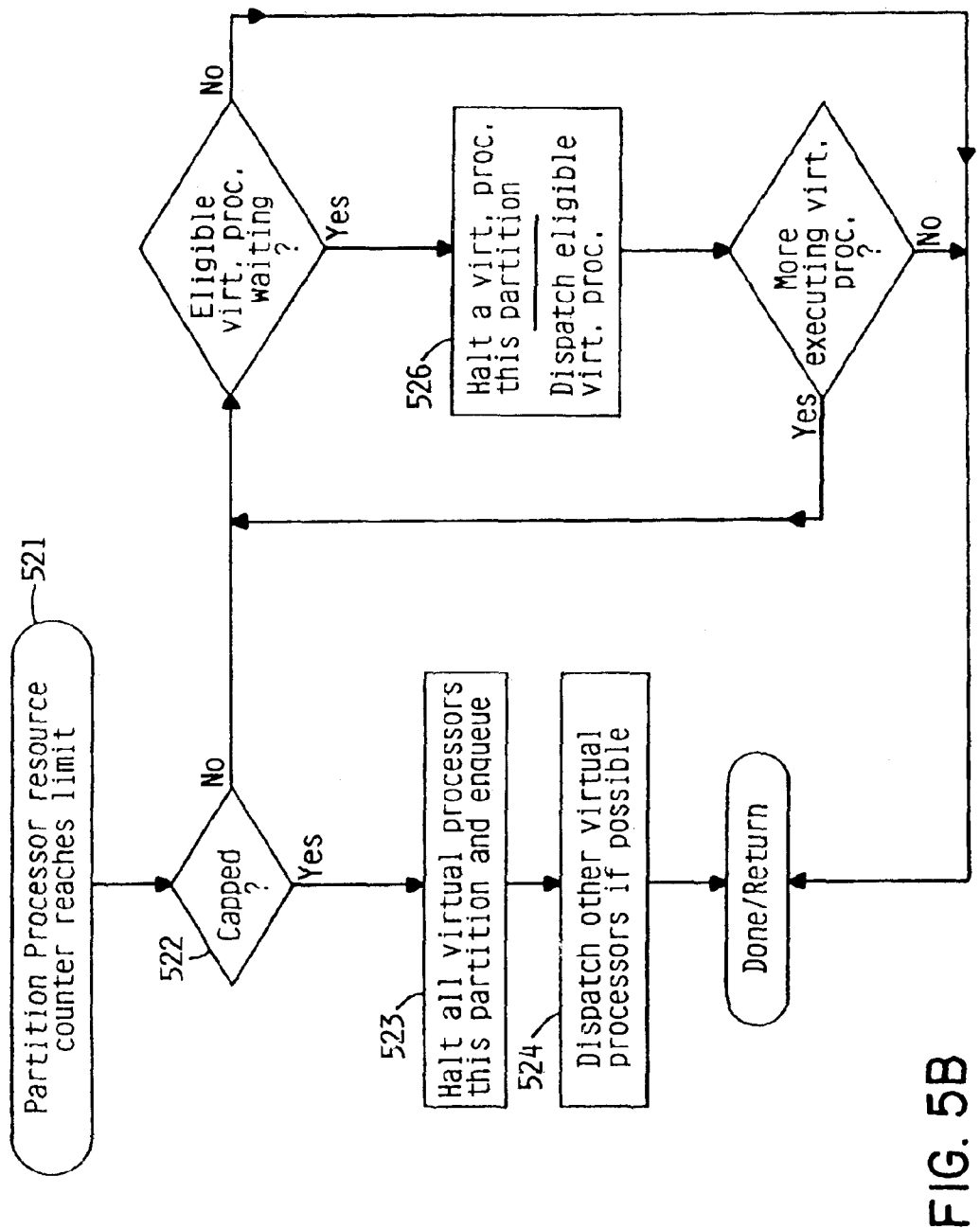

FIG. 5B illustrates the action taken when a partition processor resource counter reaches its limit (521). If the partition in question is designated a capped partition (the "Y" branch from step 522), then all executing virtual processors in the partition are halted and placed on the "eligible" queue, i.e., the queue of virtual processors available for immediate dispatch to a physical processor (step 523). Virtual processors from other partitions are dispatched to the physical processors made idle, if any such virtual processors are available for dispatch (step 524). If the partition in question (first partition) is designated uncapped (the "N" branch from step 522), then to the extent there are any virtual processors waiting on the eligible queues of other partitions in the same processor pool which could be started, the virtual processors from the partition in question are halted. This is illustrated as steps 525–527. For purposes of step 525, an eligible virtual processor is a virtual processor on the eligible queue of a second partition in the same processor pool, where the partition processor resource counter of the second partition has not yet reached its limit, and where the number of virtual processors from the second partition currently executing is less than the limit of virtual processors assigned to the second partition. If such a virtual processor exists, the "Y" branch is taken from step 525. A virtual processor from the first partition is halted and placed on its eligible queue, and a virtual processor from the second partition is dispatched to a physical processor (step 526). If there are more virtual processors in the first partition still executing (step 527), the process repeats until either all potential virtual processors from other partitions are dispatched or no virtual processors remain executing in the first partition.

Figure 5C:
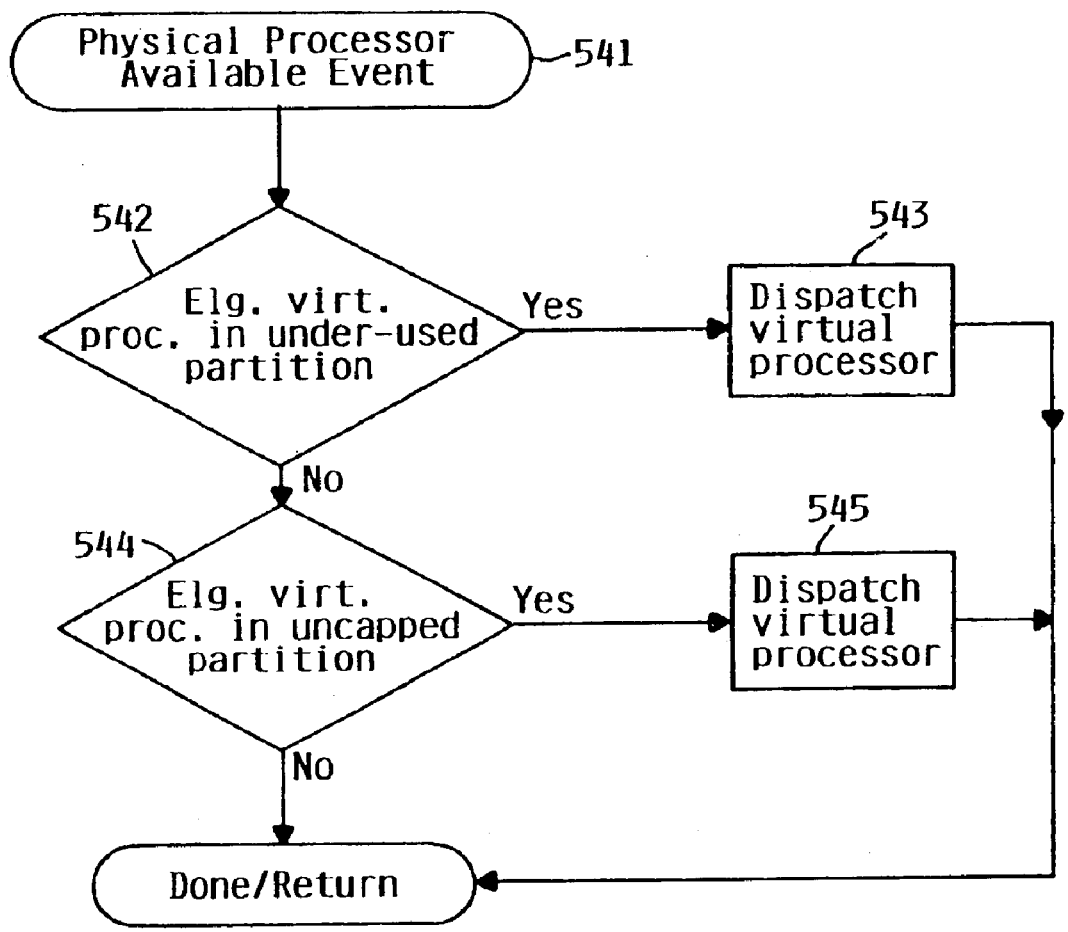

FIG. 5C illustrates the action taken to dispatch a new virtual processor when a physical processor becomes available (e.g., because an executing task terminates, or is temporarily halted to wait for some event). Upon a processor available event (541), if there is a virtual processor eligible for dispatch from a partition which has not yet reached its processor resource limit in the current time slice, the "Y" branch is taken from step 542, and the virtual processor is dispatched (step 543). For purposes of step 542, an eligible virtual processor is a virtual processor on the eligible queue of a partition in the same processor pool as the available processor, where the partition processor resource counter of the partition has not yet reached its limit, and where the number of virtual processors from the partition currently executing is less than the limit of virtual processors assigned to the partition. If no such virtual processor is available, the "N" branch is taken from step 542. In this case, if there is an eligible virtual processor from an uncapped partition which has reached its limit, the "Y" branch is taken from step 544, and the virtual processor is dispatched (step 545). For purposes of step 544, an eligible virtual processor is a virtual processor on the eligible queue of an uncapped partition in the same processor pool as the available processor, where the number of virtual processors from the partition currently executing is less than the limit of virtual processors assigned to the partition. If no such virtual processor is available, the "N" branch is taken from step 544, and the processor must remain idle for awhile.

Figure 5D:
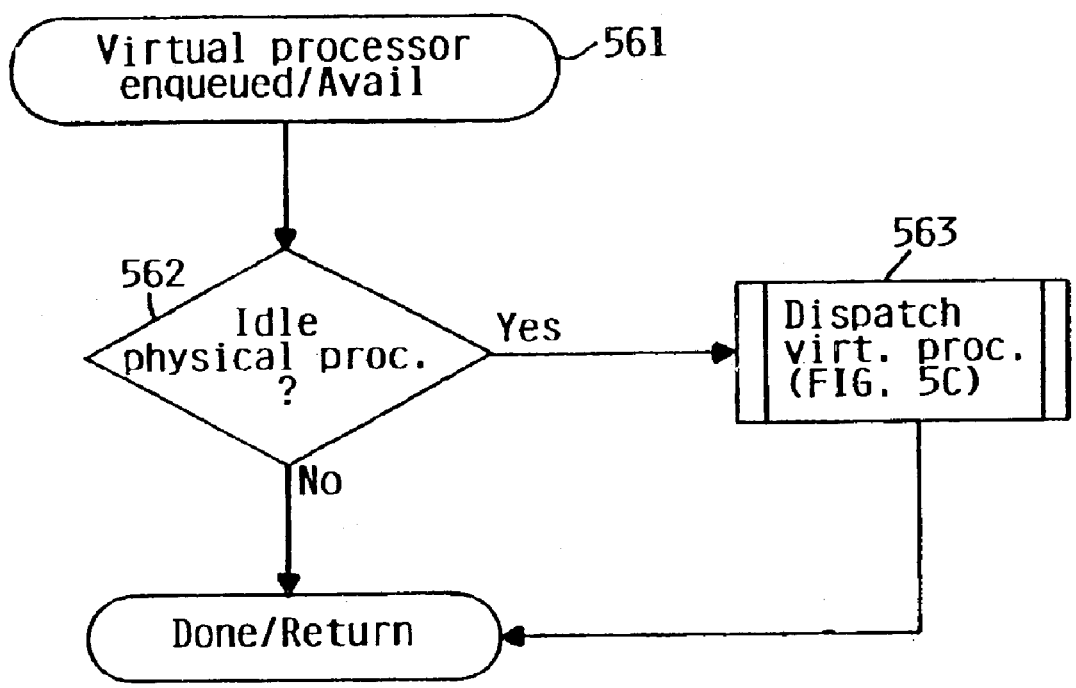

Finally, FIG. 5D illustrates the action taken when a virtual processor becomes available for dispatch. This may occur when a virtual processor enters the eligible queue (either because a the OS kernel dispatched a new task to the hypervisor, or because the OS kernel dispatched a task which was previously halted and waiting on some event is now available), or it may occur because the time slice expired and all partition processor resource counters were reset, making a virtual processor in a capped partition which had reached its limit now available for dispatch to a physical processor. When a virtual processor becomes available (561), if any physical processor in the pool to which the virtual processor's logical partition is assigned is currently idle (step 562), then a virtual processor is selected for dispatch in accordance with the actions of FIG. 5C (step 563). If no physical processor is available (the "N" branch from step 562), then the hypervisor dispatcher waits for a processor available event to initiate the dispatch actions of FIG. 5C.

It will be recognized that in steps 524, 526, 543 and 545, there could be multiple virtual processors meeting the applicable criteria, and the virtual processor dispatcher in the hypervisor may have various other priorities for selecting one from among multiple potentially eligible virtual processors, such as length of time in queue, user assigned priority of the underlying task, and so forth.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as main memory 102 and as storage devices attached to storage IOPs 111, 112 and 116.

In the preferred embodiment described above, the computer system utilizes an IBM AS/400 or I/Series architecture. It will be understood that certain implementation details above described are specific to this architecture, and that logical partitioning management mechanisms in accordance with the present invention may be implemented on different architectures, and certain implementation details may vary.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method for allocating processor resources in a computer system having a plurality of central processors, comprising the steps of:

defining a plurality of logical partitions of said computer system, wherein each task executing in said computer system is assigned to a respective one of said logical partitions;

defining a plurality of sets of processors;

assigning each central processor of said computer system to a respective set of said plurality of processor sets;

assigning each logical partition of said plurality of logical partitions to a respective set of said plurality of processor sets, wherein a first processor set of said plurality of processor sets has a plurality of logical partitions assigned to it;

assigning a respective processing capacity value to each of said plurality of logical partitions assigned to said first processor set, said processing capacity values representing processing capacity in units equivalent to a fixed number of physical central processors;

constraining tasks executing in each logical partition to execute only in central processors assigned to the processor set to which the respective logical partition is assigned; and constraining tasks executing in said each logical partition assigned to said first processor set to execute for a combined length of time equivalent to the processing capacity value assigned to the respective logical partition.

2. The method for allocating processor resources of claim 1, further comprising:

designating each respective logical partition assigned to said first processor set as either capped or uncapped;

wherein, with respect to a logical partition which is designated capped, said step of constraining tasks executing in the logical partition to execute for a combined length of time equivalent to the processing capacity value comprises preventing tasks in the partition from executing if the processing capacity value has been reached; and wherein, with respect to a logical partition which is designated uncapped, said step of constraining tasks executing in the logical partition to execute for a combined length of time equivalent to the processing capacity value comprises preventing tasks in the partition from executing if the processing capacity value has been reached, unless there is unused processing capacity in the first processor set.

3. The method for allocating processor resources of claim 1, further comprising:

assigning a respective number of virtual processors to each of said plurality of logical partitions assigned to said first processor set.

4. The method for allocating processor resources of claim 1, wherein a second processor set of said plurality of processor sets has a plurality of logical partitions assigned to it, said method further comprising:

assigning a respective processing capacity value to each of said plurality of logical partitions assigned to said second set, said capacity values representing processing capacity in units equivalent to a fixed number of physical central processors; and constraining tasks executing in said each logical partition assigned to said second processor set to execute for a combined length of time equivalent to the processing capacity value assigned to the respective logical partition.

5. The method for allocating processor resources of claim 1, further comprising:

altering a processor capacity value of a first logical partition assigned to said first set, while holding a processor capacity value of a second logical partition assigned to said first set constant.

6. The method for allocating processor resources of claim 1, wherein at least one processor set of said plurality of processor sets has only a single logical partition assigned to it.

7. A computer system, comprising:

a plurality of central processing units;

a logical partitioning configuration function which receives a user definition of a plurality of logical partitions of said computer system and a plurality of disjoint sets of said central processing units, each logical partition being assigned to a respective one of said plurality of disjoint sets of said central processing units, said logical partitioning configuration function supporting the assignment of a plurality of multiple logical partitions to a single central processing unit set;

wherein, with respect to multiple logical partitions assigned to a single central processing unit set, said logical partitioning configuration function receives a user definition of a respective processing capacity value for each of said multiple logical partitions, said processing capacity values representing processing capacity in units equivalent to a fixed number of said central processing units; and a logical partitioning enforcement function which constrains tasks executing in each logical partition to execute only in central processor units of the set of central processing units to which the respective logical partition is assigned, and constrains tasks executing in said each said multiple logical partition assigned to a single central processing unit set to execute for a combined length of time equivalent to the processing capacity value assigned to the respective logical partition.

8. The computer system of claim 7,
wherein each logical partition contains a respective task dispatching function;
wherein said logical partitioning enforcement function comprises a respective low-level virtual processor dispatcher for each set of central processing units operating below the level of said task dispatching functions, said task dispatching functions dispatching tasks to virtual processors, said virtual processor dispatchers dispatching said virtual processors to said central processing units.

9. The computer system of claim 7,
wherein, with respect to multiple logical partitions assigned to a single central processing unit set, said logical partitioning configuration function further receives a user designation of each respective partition as capped or uncapped;
wherein, with respect to a logical partition which is designated capped, said logical partitioning enforcement mechanism prevents tasks in the logical partition from executing if the processing capacity value of the logical partition has been reached; and
wherein, with respect to a logical partition which is designated uncapped, said logical partitioning enforcement mechanism prevents tasks in the logical partition from executing if the processing capacity value of the logical partition has been reached, unless there is unused processing capacity in the first processor set.

10. The computer system of claim 7,
wherein, with respect to multiple logical partitions assigned to a single central processing unit set, said logical partitioning configuration function further receives a user designation of a respective number of virtual processors for each such logical partitions; and
wherein said logical partitioning enforcement mechanism limits simultaneous execution of tasks of a logical partition of multiple logical partitions assigned to a single central processing unit set to the number of virtual processors assigned to the logical partition.

11. A computer program product for allocating processor resources in a computer system having a plurality of central processors, said computer program product comprising a plurality of computer executable instructions recorded on signal-bearing media, wherein said instructions, when executed by a computer, cause the computer to perform the steps of:
receiving a definition of a plurality of logical partitions of said computer system, wherein each task executing in said computer system is assigned to a respective one of said logical partitions;
receiving a definition of a plurality of sets of processors, wherein each central processor of said computer system is assigned to a respective one of said plurality of sets of processors, and wherein each logical partition of said plurality of logical partitions is assigned to a respective one of said plurality of sets of processors, wherein a first processor set of said plurality of processor sets has a plurality of logical partitions assigned to it;
receiving a definition of processing capacity values, wherein a respective processing capacity value is assigned to each of said plurality of logical partitions assigned to said first processor set, said processing capacity values representing processing capacity in units equivalent to a fixed number of physical central processors;
constraining tasks executing in a each logical partition to execute only in central processors assigned to the processor set to which the respective logical partition is assigned; and
constraining tasks executing in said each logical partition assigned to said first processor set to execute for a combined length of time equivalent to the processing capacity value assigned to the respective logical partition.

12. The computer program product for allocating processor resources of claim 11, wherein said program product further causes said computer to perform the steps of:
receiving a designation of each respective logical partition assigned to said first processor set as either capped or uncapped;
wherein, with respect to a logical partition which is designated capped, said step of constraining tasks executing in the logical partition to utilize the processing capacity value assigned to the respective logical partition comprises preventing tasks in the partition from executing if the processing capacity value has been reached; and
wherein, with respect to a logical partition which is designated uncapped, said step of constraining tasks executing in the logical partition to utilize the processing capacity value assigned to the respective logical partition comprises preventing tasks in the partition from executing if the processing capacity value has been reached, unless there is unused processing capacity in the first processor set.

13. The computer program product for allocating processor resources of claim 11, wherein said program product further causes said computer to perform the steps of:
receiving a designation of a respective number of virtual processors for each of said plurality of logical partitions assigned to said first processor set.

14. The computer program product for allocating processor resources of claim 11,
wherein a second processor set of said plurality of processor sets has a plurality of logical partitions assigned to it;
wherein a respective processing capacity value is assigned to each of said plurality of logical partitions assigned to said second set by said step of receiving a definition of processing capacity values, said capacity values representing processing capacity in units equivalent to a fixed number of physical central processors; and
wherein tasks executing in said each logical partition assigned to said second processor set to are constrained to utilize the processing capacity value assigned to the respective logical partition.

15. The computer program product for allocating processor resources of claim 11, wherein said program product further causes said computer to perform the steps of:
altering a processor capacity value of a first logical partition assigned to said first set responsive to user input, while holding a processor capacity value of a second logical partition assigned to said first set constant.

16. The computer program product for allocating processor resources of claim 11, wherein at least one processor set of said plurality of processor sets has only a single logical partition assigned to it.

* * * * *